UNITED STATES PATENT OFFICE.

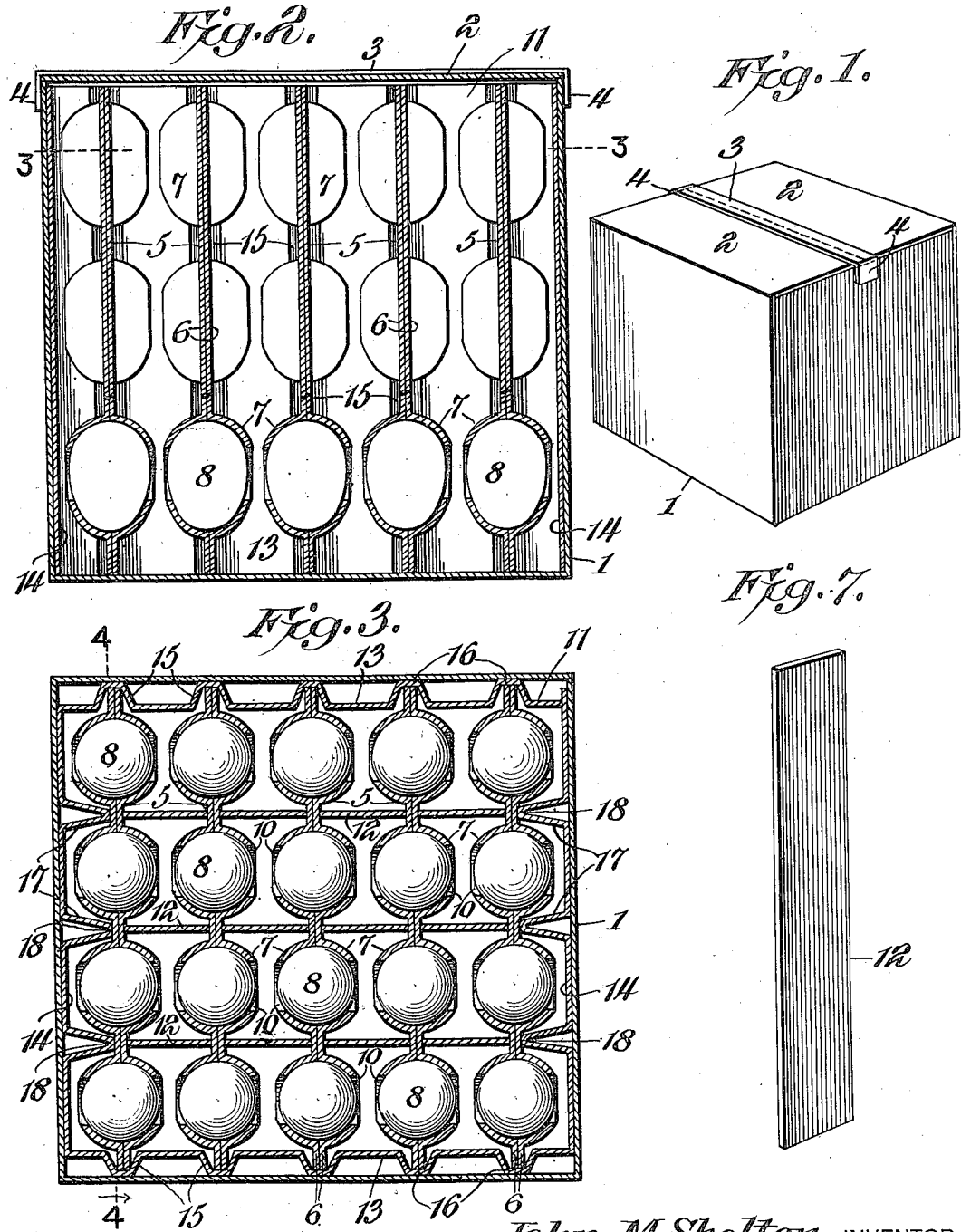

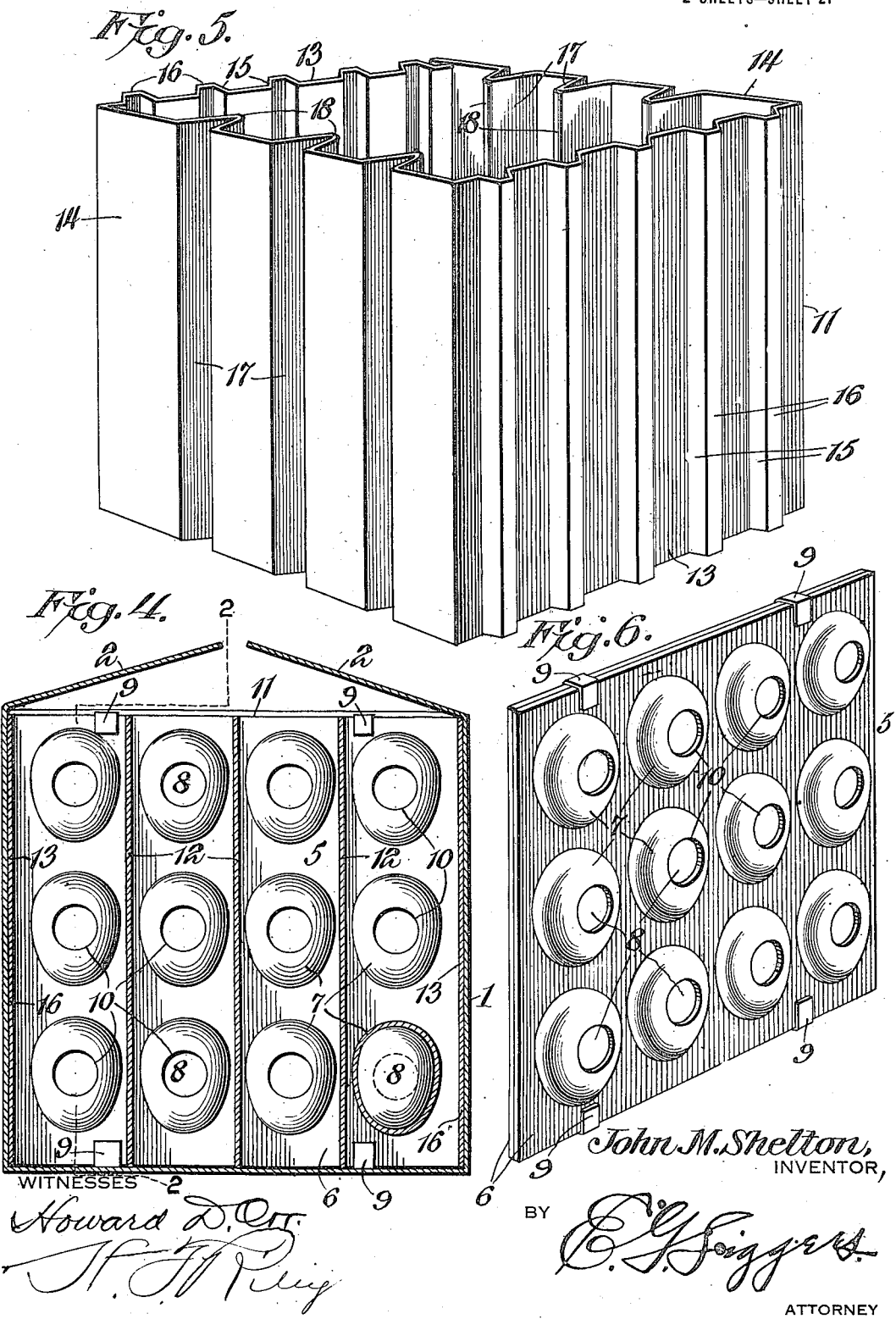

JOHN M. SHELTON, OF OKLAHOMA, OKLAHOMA, ASSIGNOR TO THE JNO. M. SHELTON EGG CARRIER COMPANY, A CORPORATION OF OKLAHOMA.

EGG-CASE.

1,143,146.　　　　Specification of Letters Patent.　　Patented June 15, 1915.

Application filed September 20, 1912, Serial No. 721,461. Renewed February 27, 1915. Serial No. 11,027.

*To all whom it may concern:*

Be it known that I, JOHN M. SHELTON, a citizen of the United States, residing at Oklahoma city, in the county of Oklahoma and State of Oklahoma, have invented a new and useful Egg-Case, of which the following is a specification.

The invention relates to improvements in egg cases.

The object of the present invention is to improve the construction of egg cases, and to provide a simple, efficient and comparatively inexpensive structure, adapted to enable eggs to be handled with the same facility as ordinary merchandise without liability of breaking the eggs.

A further object of the invention is to provide an egg case, equipped with egg holders designed to contain a dozen or other predetermined number of eggs, and adapted to maintain the same in a vertical position with the points down, and capable of enabling the eggs to be easily and accurately tested and of being stamped or otherwise marked while the eggs are in the holders.

Another object of the invention is to provide an egg holder or carrier of this character, adapted in the handling of eggs either during the packing of an egg case, or in the retail sale of the eggs, of preventing the eggs from being injured through contact with the supporting surface upon which the holder or carrier may be placed.

The invention also has for its object to provide an egg case in which the egg holders or carriers may be easily and quickly assembled and readily removed for testing, sale, or other purpose.

With these and other objects in view, the invention consists in the construction and novel combination of parts hereinafter fully described, illustrated in the accompanying drawings, and pointed out in the claims hereto appended; it being understood that various changes in the form, proportion, size and minor details of construction, within the scope of the claims, may be resorted to without departing from the spirit or sacrificing any of the advantages of the invention.

In the drawings:—Figure 1 is a perspective view of an egg receptacle, constructed in accordance with this invention and shown closed and sealed. Fig. 2 is a vertical sectional view, taken substantially on the line 2—2 of Fig. 4, the box being closed and sealed. Fig. 3 is a horizontal sectional view on the line 3—3 of Fig. 2. Fig. 4 is a vertical sectional view on the line 4—4 of Fig. 3, the cover being open. Fig. 5 is a detail perspective view of the lining. Fig. 6 is a similar view of one of the egg holders or carriers. Fig. 7 is a detail perspective view of one of the straight vertical spacing strips.

Like numerals of reference designate corresponding parts in all the figures of the drawings.

In the accompanying drawings in which is illustrated the preferred embodiment of the invention, 1 designates a receptacle preferably of cubical form and constructed of paper, or any other suitable material and provided with a lid or cover composed of two hinged sections or members 2, designed in practice to be sealed in their closed position by a strip 3 of adhesive paper tape, extending along the contiguous edges of the sections or members of the cover and having terminal portions 4, secured to the outer faces of the opposite sides of the receptacle 1, as clearly illustrated in Fig. 1 of the drawings. In practice the receptacle 1 will be collapsible, but as any form of collapsible box may be employed, illustration thereof is deemed unnecessary. The receptacle will also preferably be of a size to contain five egg holders or carriers 5, each containing one dozen eggs. When constructed in this manner, each receptacle will contain five dozen eggs, and six of these receptacles will fill an ordinary crate, which contains the usual thirty dozen eggs, but receptacles of any other desired size may, of course, be employed.

The egg holders or carriers 5 are arranged in a vertical position within the box or receptacle 1, and each consists of two rectangular sheets 6 of paste board having pressed or otherwise formed therein ovate cavities 7, arranged in rows, as clearly illustrated in Figs. 4 and 6 of the drawings. The sheets or sections of the egg holders or carriers are fitted together face to face with the cavities coinciding and forming egg cells, which receive and conform to the configuration of eggs 8. Each egg cell has its major axis in a vertical position and is tapered downwardly to support the egg in a vertical position with the point downward, so that the white of the egg, which surrounds the yolk, will cushion the latter and prevent the yolk from coming in contact with the skin of the egg shell. By supporting the eggs in this position, it is possible to keep them in proper condition indefinitely in a temperature ranging from forty to sixty degrees Fahrenheit. The closed and sealed receptacle will also assist in preserving the eggs in proper condition, as it will prevent circulation of air, evaporation and consequent drying of the eggs.

The sheets or sections 6 are secured together at their opposite edges by strips 9 of adhesive paper tape, which extends across the adjacent edges of the sheets or members and have their terminals arranged at the outer faces of the said sheets or members. These strips, which are preferably arranged in pairs, as shown, may be of any desired number, and they may be easily and quickly applied to the sheets or members of the egg holders or carriers, but any other suitable fastening means may, of course, be employed, as the sheets extend beyond the egg cells a sufficient distance to enable the sheets or members to be secured together in any desired manner. The sheets or members are provided in the walls of their egg receiving cavities with relatively large central circular openings 10, arranged directly opposite each other in transverse alinement at opposite sides of each vertical egg cell. In practice these openings 10 will be one inch in diameter to afford ample space for stamping or otherwise marking on the eggs the date when they were laid or packed and also to enable the eggs to be easily and accurately tested. The side openings of the cells are of sufficient size to enable the person examining or testing the eggs to see around or beyond the unbroken yolk of an egg in perfect condition, and they will enable the character of the eggs and the condition of the yolks thereof to be ascertained at a glance. The walls of the egg receiving cavities at the openings 10 are sufficiently thick to project beyond the plane of the side faces of the eggs to prevent the latter from being broken through contact with any surface upon which the egg holder or carrier may be placed either during the packing of the eggs or in retailing or otherwise handling the holders or carriers.

The egg holders or carriers are maintained in a vertical position within the receptacle 1 and in spaced relation with one another by means of a rectangular lining 11 and straight vertical spacing strips 12. The lining, which is arranged at the inner faces of the vertical walls of the receptacle 1, is composed of sides 13 and 14, and it may consist of a single piece of paste board or other suitable material, or be formed in any other desired manner. The sides 13, which are located opposite each other and in parallelism, are provided at intervals with vertical guide grooves 15, which receive the vertical edges of the sheets or members of the egg holders or carriers. These vertical guide grooves, which space the egg holders or carriers at their vertical side edges, are formed by outwardly extending crimps, forming outwardly converging sides and flat connecting portions 16, which fit flat against the inner faces of the contiguous vertical walls of the receptacle. The tapering guide grooves or channels enable the egg holders or carriers to be rapidly placed in the receptacle in a vertical position, and they also permit the ready withdrawal of any of the holders or carriers.

The sides 14 of the lining are provided at intervals with vertical spacing and bracing ribs 17 formed by tapered inwardly extending crimps or bends and being of sufficient size to extend from the side walls of the receptacle into the space between the egg cells and fit against the outer sheets or members of the contiguous carriers or holders between the vertical rows of egg cells, as clearly illustrated in Fig. 3 of the drawings. The vertical spacing ribs 17 have converging sides, connected by flat portions 18, which fit against the contiguous sections or members of the egg holders or carriers.

The egg holders or carriers are spaced and braced by the straight vertical strips 12 interposed between the said holders or carriers, and fitting between the vertical rows of egg cells and thereby interlocked with the holders or carriers against horizontal displacement. The vertical rows of spaced egg cells form intervening guides or ways to receive the vertical edges of the spacing strips 12, which are arranged in alinement with one another and in the planes of the spacing and bracing ribs, as clearly illustrated in Fig. 3 of the drawings. The straight vertical strips coact with the bracing ribs to form continuous braces, extending from one side 14 of the receptacle to the opposite side thereof, and the egg holders or carriers are thereby maintained in proper spaced relation and are prevented from coming in contact with one another during the handling of the receptacle. This structure enables the eggs contained within the receptacle to be handled with the same facility as ordinary merchandise, as it will be impossible to break the eggs without actually crushing the receptacle.

When the receptacle is unsealed and opened, all of the egg holders or carriers are exposed and any one of the same may be readily removed for sale or inspection. The eggs are designed to remain in the holder or carrier until removed by the consumer, the cheapness of the carriers or holders rendering their preservation for reuse immaterial.

What is claimed is:—

1. A device of the class described including vertical egg carriers or holders, each composed of two sheets of thin material fitted flat against each other and provided with coinciding cavities fitting together and forming egg cells conforming to the configuration of an egg and arranged to support the eggs in a vertical position with their points at the bottom, and means for supporting the egg holders in a vertical position upon their lower edges, said means including a receptacle provided at opposite sides with spaced vertical guides arranged at intervals and receiving the vertical edges of the egg holders, and removable means separate from the egg holders for spacing the latter between the guides, said removable means being held in position by the egg cells.

2. A device of the class described comprising vertical egg carriers or holders, each composed of two sheets of thin material fitted flat against each other and provided with coinciding cavities fitting together and forming egg cells conforming to the configuration of an egg and arranged to support the eggs in a vertical position with their points at the bottom, and means for supporting the egg holders in a vertical position upon their lower edges, said means including a receptacle, a lining of thin material arranged within the receptacle and creased or bent to form opposite vertical guides, which receive the vertical side edges of the egg holders, and means located at intervals between the guides and held in position by the egg cells for spacing the egg holders or carriers.

3. A device of the class described comprising vertical egg carriers or holders, each composed of two sheets of thin material fitted flat against each other and provided with coinciding cavities fitting together and forming egg cells conforming to the configuration of an egg and arranged to support the eggs in a vertical position with their points at the bottom, and means for supporting the egg holders in a vertical position upon their lower edges, said means including a receptacle provided with a lining of thin material having opposite guide grooves formed by outwardly extending crimps or bends and receiving slidably the vertical side edges of the said egg holders.

4. A device of the class described including egg holders composed of two sheets of thin material fitted flat against each other and provided with coinciding cavities fitting together and forming egg cells conforming to the configuration of an egg and arranged to support the eggs in a vertical position with their points at the bottom, said egg cells being arranged in spaced vertical rows, and means for supporting the egg holders in a vertical position upon their lower edges, said means comprising a receptacle having a lining of thin material bent or creased to form inwardly extending bracing ribs arranged at intervals at opposite sides of the receptacle and fitting against the adjacent egg holders between the vertical rows of the egg cells, said lining being also provided at the other sides of the receptacle with grooves receiving the vertical side edges of the egg holders.

5. A device of the class described including egg holders composed of two sheets of thin material fitted flat against each other and provided with coinciding cavities fitting together and forming egg cells conforming to the configuration of an egg and arranged to support the eggs in a vertical position with their points at the bottom, said egg cells being arranged in spaced vertical rows, and means for supporting the egg holders in a vertical position upon their lower edges, said means comprising a receptacle having a lining of thin material bent or creased to form inwardly extending bracing ribs arranged at intervals at opposite sides of the receptacle and fitting against the adjacent egg holders between the vertical rows of the egg cells, and vertical spacing strips arranged in the plane of the said ribs and interposed between the egg holders and slidably fitted between the vertical rows of egg cells and retained in place by the latter.

6. A device of the class described including a receptacle, a rectangular lining arranged within the receptacle and provided at two of its sides with opposite vertical guide grooves and having inwardly extending vertical bracing and spacing ribs at the other two sides, a plurality of vertical egg holders or carriers slidably fitting at their side edges in the said grooves and provided with vertical rows of egg cells, the said ribs fitting between the rows of the cells of the outermost holders or carriers, and vertical spacing strips interposed between the holders or carriers and slidably fitting between the vertical rows of egg cells and coacting with the ribs to form continuous braces.

In testimony, that I claim the foregoing as my own, I have hereto affixed my signature in the presence of two witnesses.

JOHN M. SHELTON.

Witnesses:
 JOHN H. SIGGERS,
 EDITH L. BROWN.